(12) United States Patent
Vankamamidi et al.

(10) Patent No.: US 11,163,678 B2
(45) Date of Patent: Nov. 2, 2021

(54) MANAGING STORAGE SPACE FOR METADATA CONSISTENCY CHECKING

(71) Applicant: EMC IP Holding Company LLC, Hopkinton, MA (US)

(72) Inventors: Vamsi K. Vankamamidi, Hopkinton, MA (US); Philippe Armangau, Acton, MA (US); Daniel E. Cummins, Hudson, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 69 days.

(21) Appl. No.: 16/819,722

(22) Filed: Mar. 16, 2020

(65) Prior Publication Data

US 2021/0286719 A1    Sep. 16, 2021

(51) Int. Cl.

| | |
|---|---|
| *G06F 12/00* | (2006.01) |
| *G06F 12/02* | (2006.01) |
| *G06F 12/0873* | (2016.01) |
| *G06F 16/182* | (2019.01) |
| *G06F 12/0811* | (2016.01) |

(52) U.S. Cl.
CPC ...... *G06F 12/0246* (2013.01); *G06F 12/0253* (2013.01); *G06F 12/0292* (2013.01); *G06F 12/0811* (2013.01); *G06F 12/0873* (2013.01); *G06F 16/1827* (2019.01); *G06F 2212/7207* (2013.01)

(58) Field of Classification Search
CPC ............ G06F 12/0246; G06F 12/0253; G06F 12/0292; G06F 12/0811; G06F 12/0873; G06F 16/1827; G06F 2212/7207
See application file for complete search history.

(56) References Cited

U.S. PATENT DOCUMENTS

2019/0235782 A1\* 8/2019 Yu .................. G06F 12/023

\* cited by examiner

*Primary Examiner* — Shawn X Gu
(74) *Attorney, Agent, or Firm* — BainwoodHuang

(57) ABSTRACT

A method of managing storage space for a metadata consistency checking procedure (MCCP) is provided. The method includes (a) tracking an amount of metadata and an amount of user data organized by the metadata; (b) provisioning a quantity of storage dedicated to the MCCP based, at least in part, on a ratio of the amount of metadata to the amount of user data; and (c) upon initiation of the MCCP, building tracking structures within the provisioned storage dedicated to the MCCP. An apparatus, system, and computer program product for performing a similar method are also provided.

15 Claims, 4 Drawing Sheets

MANAGING STORAGE SPACE FOR METADATA CONSISTENCY CHECKING

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Many storage systems provide tools for checking internal consistency. For example, Linux-based systems may use FSCK (file system consistency check) to check and repair file system errors. Errors may arise, for example, from corruption in metadata used to map and organize file system data. Modern file systems include enough redundancy in metadata so that many errors can be repaired. Some errors may not be repairable, however, resulting in data loss.

SUMMARY

Many modern storage systems use metadata to organize logical disks, outside the context of filesystems. Errors in this metadata can also cause problems, including system-wide unavailability in some instances. Thus a type of consistency checking may also be applied to this metadata in order to detect and/or correct errors. One challenge is that these systems often include extremely large amounts of metadata (e.g., 10% or more), and although large portions of the metadata should be cross-checked, it may not be possible to load all of the metadata into memory at once. This is problematic because constant paging in and out of memory for such a large amount of metadata could be so slow as to be entirely impractical. One solution is to work through the metadata and to create and store tracking structures that can be stored more efficiently than the entirety of the metadata. Although these tracking structures also typically cannot be stored entirely within memory, they can significantly speed the metadata consistency checking even when stored on disk.

Unfortunately, the use of tracking structures requires sufficient space to store all of the tracking structures. If there is not enough space available, the metadata consistency checking will fail. Although it is possible to reserve space for the exclusive use of metadata consistency checking, the amount of space necessary can vary considerably depending on the type of user data and characteristics of the metadata. For example, the amount of space needed for the tracking structures depends, to a degree, on the amount of metadata, which can take up more space in certain cases (e.g., when the user data is such that a high compression ratio is achieved, when a large amount of deduplication is used, etc.). Thus, if a system with a higher than normal compression ratio or a higher than normal amount of deduplication is subject to metadata consistency checking, use of a fixed percentage reserved for metadata consistency checking may be insufficient, leading to failure. Moreover, it would not be efficient to just reserve even more space than typically needed for metadata consistency checking because that could result in a large amount of wasted space.

Thus, it would be desirable to dynamically reserve exactly enough space for metadata consistency checking, based on the actual amount of metadata used, and particularly based on a ratio of metadata to user data. The metadata and user data usages can be tracked, allowing a ratio to be calculated as usage changes. A mapping between this ratio and a target percentage of the space under management to be reserved can then be applied to allow dynamic allocation of an appropriate amount of space for metadata consistency checking. For example, a table of discrete values can be used, or a formula can be applied.

In one embodiment, a method of managing storage space for a metadata consistency checking procedure (MCCP) is provided. The method includes (a) tracking an amount of metadata and an amount of user data organized by the metadata; (b) provisioning a quantity of storage dedicated to the MCCP based, at least in part, on a ratio of the amount of metadata to the amount of user data; and (c) upon initiation of the MCCP, building tracking structures within the provisioned storage dedicated to the MCCP. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for dynamically reserving close to exactly enough space for metadata consistency checking. This result may be accomplished by basing a reservation on the actual amount of metadata used and particularly based on a ratio of metadata to user data. The metadata and user data usages can be tracked, allowing a ratio to be calculated as usage changes. A mapping between this ratio and a target percentage of the space under management to be reserved can then be applied to allow dynamic allocation of an appropriate amount of space for metadata consistency checking. For example, a table of discrete values can be used, or a formula can be applied.

Figure 1:
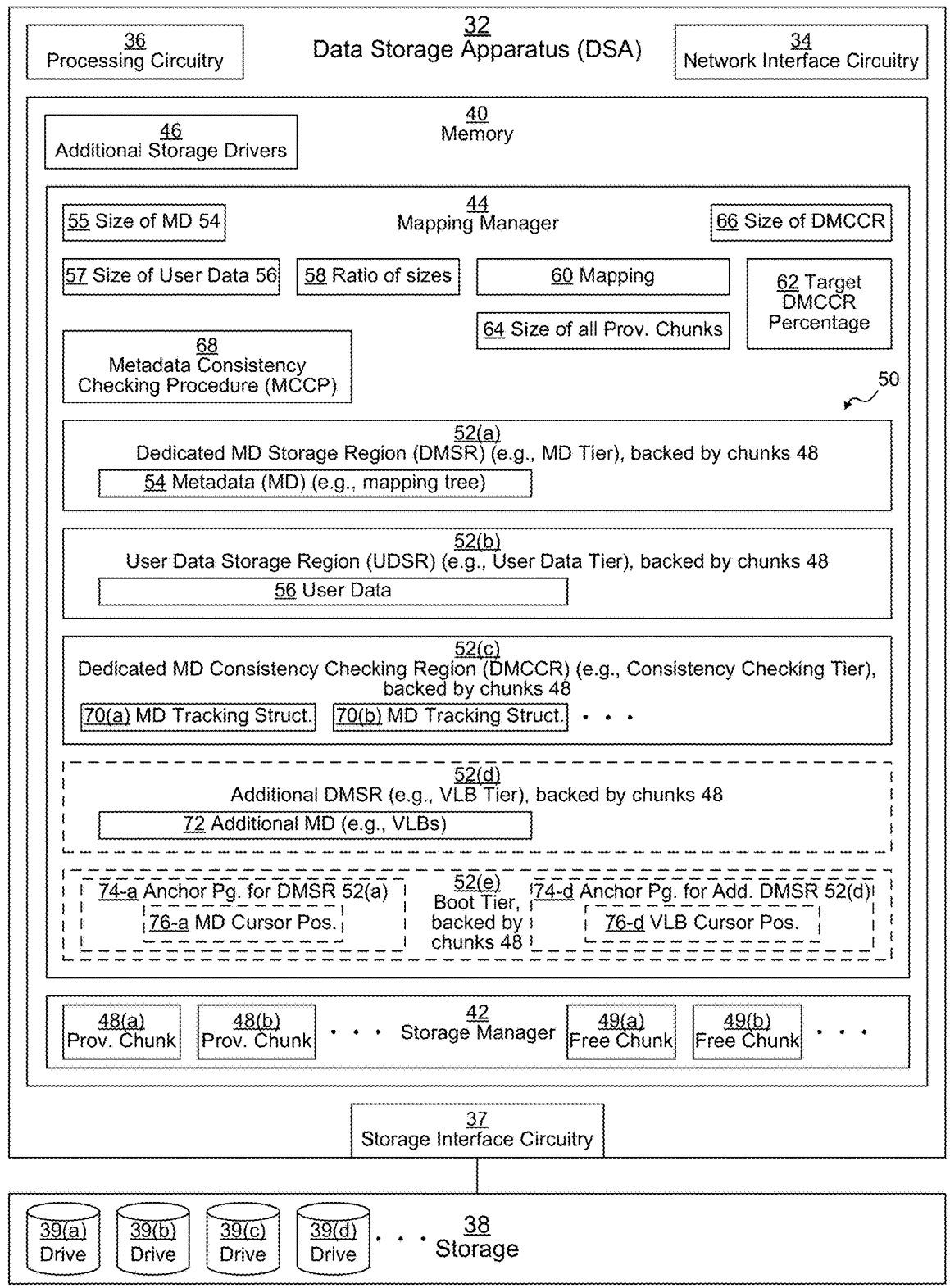
FIG. 1 is a block diagram depicting an example system, apparatus, and data structure arrangement for use in connection with various embodiments.

FIG. 1 depicts an example data storage environment (DSE) 30. DSE 30 may include one or more data storage apparatus (DSA) 32. Each DSA 32 may be any kind of computing device or collection (or cluster) of computing devices, such as, for example, a personal computer, workstation, server computer, enterprise server, data storage array device, laptop computer, tablet computer, smart phone, mobile computer, etc.

DSA 32 at least includes processing circuitry 36, storage interface circuitry 37, and memory 40. In some embodiments, a DSA 32 may also include network interface circuitry 34 as well as various other kinds of interfaces (not depicted). DSA 32 also includes interconnection circuitry (not depicted).

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage devices 39 (depicted as drives 39(a), 39(b), 39(c), 39(d), . . . ), such as, for example, hard disk drives, solid-state storage devices (SSDs), flash drives, NVMe drives, etc. In some embodiments, storage 38 may be located within the DSA 32 itself, while in other embodiments, some or all of the storage 38 may be located external to the DSA 32.

Network interface circuitry 34 may include one or more Ethernet cards, cellular modems, Fibre Channel (FC) adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc. Network interface circuitry 34 allows the DSA 32 to communicate with one or more host devices (not depicted) over the network.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a storage manager 42, mapping manager 44, various additional storage drivers 46, and other software modules (not depicted) which each execute on processing circuitry 36. In some embodiments, storage manager 42, mapping manager 44, and some of the various additional storage drivers 46 constitute layers of a multi-layered storage stack (not depicted).

Storage manager 42 aggregates and divides storage 38 into a plurality of chunks 48, 49 of storage, including provisioned chunks 48 (which have already been provisioned for use) and free chunks 49 (which are still available to be provisioned). In some embodiments, storage manager 42 may organize the drives 39 into one or more redundancy groups (not depicted). A redundancy group is a logical grouping of drives 39 from which stripes are drawn and provided to the mapping manager 44 as provisioned chunks 48. Each drive 39 is logically divided into a set of extents (not depicted). Typically, each extent is a logically-contiguous set of storage locations within the drive 39. Each extent is typically the same size within any given redundancy group. In some embodiments, each extent is 4 gigabytes, although this is by way of example only; in other embodiments, an extent may be larger or smaller. For example, an extent may be as small as one sector (e.g., 512 bytes) or one block (e.g., 4 or 8 kilobytes). Different drives 39 may have different numbers of extents therein. Groups of extents from different drives 39 are combined to form chunks 48, 49, as is known in the art, using RAID or Mapped RAID techniques, for example. An example Mapped Raid arrangement is described in U.S. patent application Ser. No. 16/773,774 (filed Jan. 27, 2020), incorporated herein by this reference. In some embodiments, each chunk 48, 49 is the same size, such as, for example, forty-eight gigabytes (GB), although this is by way of example only; in other embodiments, a chunk 48, 49 may be larger or smaller.

Mapping manager 44 maintains a logical mapping of a namespace (not depicted) into provisioned chunks 48. The namespace allows various logical disks (and other data objects) to be assigned different address ranges, with particular addresses in the namespace assigned to particular portions of the provisioned chunks 48. An example configuration of a namespace is described in U.S. patent application Ser. No. 16/773,774.

Mapping manager 44 also manages a set 50 of dedicated storage areas, such as tiers 52, which are each backed by a separate set of provisioned chunks 48. The set 50 includes at least a dedicated metadata (MD) storage region (DMSR) 52(a) (e.g., a metadata tier), a user data storage region (UDSR) 52(b) (e.g., a user data tier), and a dedicated metadata consistency checking region (DMCCR) 52(c) (e.g., a consistency checking tier). In some embodiments, set 50 also includes an additional DMSR 52(d) for storing a different type of metadata and a boot tier 52(e) for storing various system information.

UDSR 52(b) stores user data 56. In some embodiments, the user data 56 is stored in a journaling form, with all new blocks of data (not depicted) written sequentially, with user data 56 from multiple logical disks comingled. Blocks are not overwritten, but rather replaced with new blocks and invalidated. Eventually, provisioned chunks 48 of UDSR 52(b) that contain large amounts of invalidated blocks undergo garbage collection and are returned back to the storage manager 42 as free chunks 49.

DMSR 52(a) stores metadata 54 that organizes the user data 56. For example, metadata 54 may include one or more trees of metadata nodes (not depicted), such as, for example, as described in U.S. patent application Ser. No. 16/773,774. It should be noted that in systems in which snapshots of logical disks are taken periodically (with snapshots sharing most underlying blocks of data unless there is a write split), although some metadata nodes may be shared between snapshots and the main logical disk, many of the metadata nodes are not shared, which leads to a large increase in the amount of metadata 54 due to the use of snapshotting.

The size 55 of all of the metadata 54 (plus the additional metadata 72 within additional DMSR 52(d), if used) is calculated as it changes. Similarly, the size 57 of the user data 56 is calculated as it changes. Mapping manager 44 is then able to calculate an updated ratio 58 between sizes 55, 57, as those sizes 55, 57 change. In an example embodiment in which 2:1 compression is achieved, in which 2:1 deduplication is achieved, and in which there are an average of 5 write splits per block, the size 55 of the metadata 54 is typically approximately 16% of the size 57 of the user data 56. However, the compression and deduplication ratios and the average number of write splits can vary significantly, so it is important to calculate the ratio 58 often.

Mapping manager 44 also utilizes a conversion relationship or mapping 60 to map between the ratio 58 and a target DMCCR percentage 62. In some embodiments, mapping 60 may be a table. As an example, see Table 1.

TABLE 1

Example Mapping Table

| Metadata:User Data Ratio | Target DMCCR Percentage |
|---|---|
| 0-20% | 2.5% |
| 20-40% | 4% |
| >40% | 6% |

In other embodiments, mapping 60 may be a mathematical formula. For example, the mapping 60 may be a formula in which the ratio 58 is divided by 6.5 to yield the target DMCCR percentage 62.

Mapping manager 44 then sizes the DMCCR 52(c) based, at least in part on the target DMCCR percentage 62. In some embodiments, this may be done by multiplying the target DMCCR percentage 62 by the size 57 of the user data 56 to yield the size 66 of the DMCCR 52(c). In other embodiments, the size 64 of all of the provisioned chunks 48 that have been provided by the storage manager 42 to the mapping manager 44 is used to calculate the size 66 of the DMCCR 52(c). Thus, as one example, mapping manager 44 sizes the DMCCR 52(c) by multiplying the target DMCCR percentage 62 by the size 64 of all of the provisioned chunks 48 to yield the size 66 of the DMCCR 52(c). As another example, mapping manager 44 performs a calculation such that, after provisioning the DMCCR 52(c) with chunks 48, its size 66 will be equal to the target DMCCR percentage 62 multiplied by the size 64 of all of the provisioned chunks 48 after provisioning the new chunks 48 to the DMCCR 52(c). It should be understood that the size 66 of the DMCCR 52(c) may not exactly equal the calculated value after provisioning because, in some embodiments, a tier 52 can only be provisioned with an integer number of chunks 48 (which can significantly affect the calculations if each chunk 48, 49 is 48 GB in size).

Memory 40 also includes a Metadata Consistency Checking Procedure (MCCP) 68, which can be activated when the metadata 56, 72 requires a consistency check (e.g., if any corruption is noticed). In some embodiments, when MCCP 68 is activated, all logical disks that share the same metadata 54 are taken off-line. In other embodiments, the logical disks may remain on-line in read-only mode. Once activated, MCCP 68 pre-processes metadata 56, 72 to create metadata tracking structures 70 that are stored within the DMCCR 52(c) and then used to validate (and correct, if possible) the metadata 56, 72.

In some embodiments, Additional DMSR 52(d) stores additional metadata 72 also used to organize the user data 56. For example, additional metadata 72 may include virtual logical blocks (VLBs), which are data structures that point to blocks of user data 56 and keep track of reference counts. Thus, VLBs enable deduplication by allowing multiple logical disks (or even multiple logical addresses within a single logical disk) to share the same underlying block of user data 56. In some embodiments, the VLBs may be stored in DMSR 52(a) rather than in Additional DMSR 52(d).

In some embodiments, boot tier 52(e) is used to store information about the other tiers 52. Thus, boot tier 52(e) may store an anchor page 74 for one or more of the other tiers 52. For example, as depicted, anchor page 74-a represents DMSR 52(a), and it includes a metadata cursor position 76-a that indicates a position within DMSR 52(a) where new metadata 54 is to be written (although, in some embodiments, new metadata 54 is preferentially written to an empty location prior to the MD cursor position 76-a if available—see below in connection with FIG. 4). The MD cursor position 76-a can be used to calculate the size 55 of the metadata 54.

In addition, as depicted, anchor page 74-d represents Additional DMSR 52(d), and it includes a VLB cursor position 76-d that indicates a position within Additional DMSR 52(d) where new additional metadata 72 (e.g., VLBs) is to be written (although, in some embodiments, new additional metadata 72 is preferentially written to an empty location prior to the cursor position 76-d if available—see below in connection with FIG. 4). The VLB cursor position 76-d can also be used to calculate the size 55 of the metadata 54 (together with the MD cursor position 76-a).

Memory 40 may also store various other data structures used by the OS, storage manager 42, mapping manager 44, various additional storage drivers 46, MCCP 68, and various other applications. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the DSA 32 is powered off. The OS, applications, storage manager 42, mapping manager 44, MCCP 68, and various additional storage drivers 46 are typically stored in this persistent storage portion of memory 40 or on persistent storage 38 so that they may be loaded into a system portion of memory 40 upon a system restart or as needed. The storage manager 42, mapping manager 44, MCCP 68, and various additional storage drivers 46, when stored in non-transitory form either in the volatile portion of memory 40 or on persistent storage 38 or in persistent portion of memory 40, each form a computer program product. The processing circuitry 36 running one or more applications thus forms a specialized circuit constructed and arranged to carry out the various processes described herein.

Figure 2:
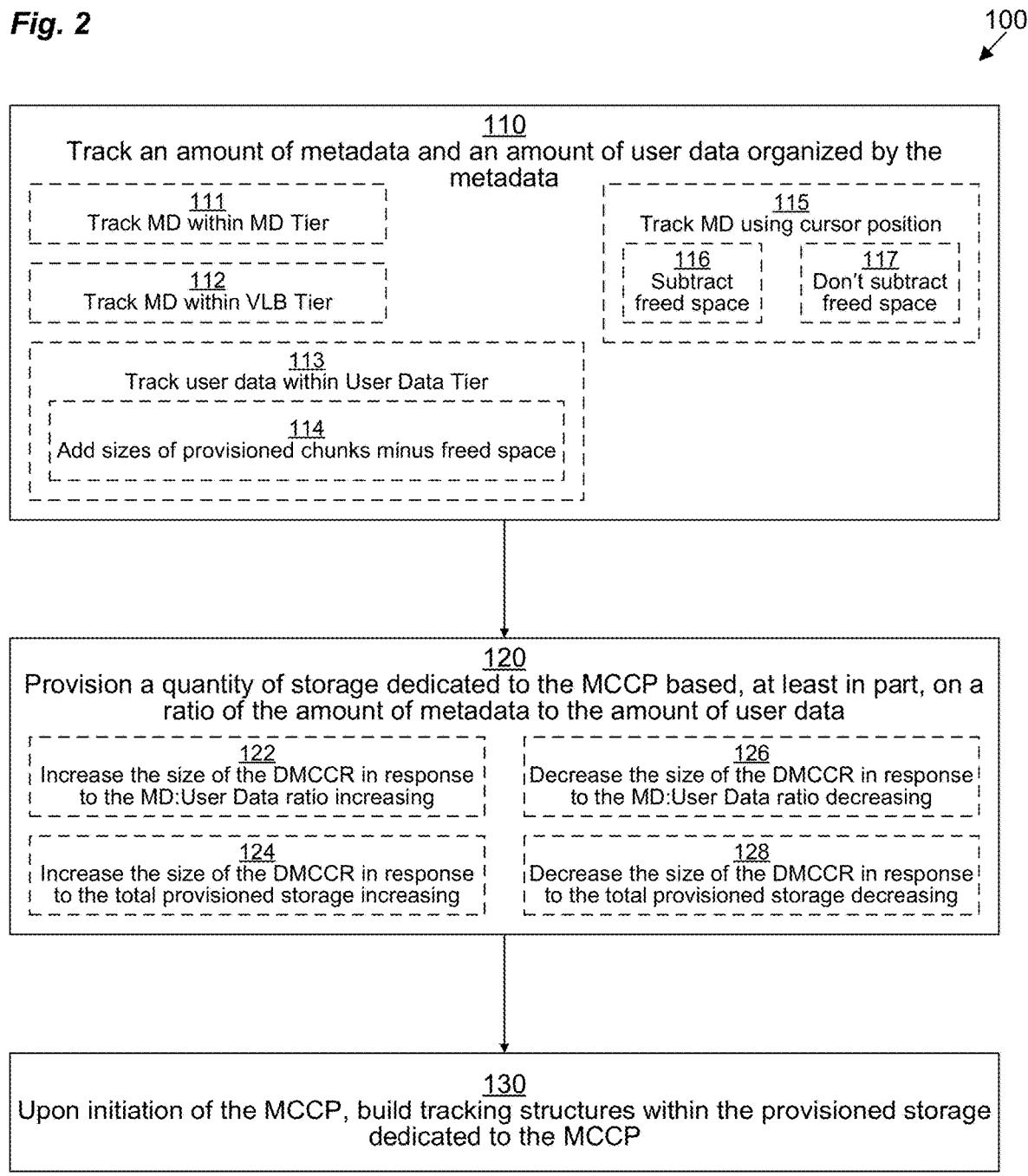
FIG. 2 is a flowchart depicting example methods of various embodiments.

FIG. 2 illustrates an example method 100 performed by DSA 32 for method of managing storage space for an MCCP 68. It should be understood that any time a piece of software (e.g., storage manager 42, mapping manager 44, various additional storage drivers 46, MCCP 68) is described as performing a method, process, step, or function, what is meant is that a computing device (e.g., DSA 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that sub-steps are either optional or representative of alternate embodiments or use cases.

In step 110, DSA 32 tracks an amount (e.g., size 55) of metadata 54 and an amount (e.g., size 57) of user data 56 organized by the metadata 54. In some embodiments, step 110 is performed by mapping manager 44. In some embodiments, in sub-step 111, this step includes tracking the amount of metadata 54 within DMSR 52(a) (e.g., a dedicated metadata tier). In some of these embodiments, in sub-step 112, this step also includes tracking the amount of additional metadata 72 within Additional DMSR 52(d) (e.g., a dedicated VLB tier).

In some embodiments, in sub-step 111, step 110 includes tracking the amount of user data 56 within UDSR 52(b)

(e.g., a dedicated user data tier). This may be accomplished via sub-step 114, in which the number of provisioned chunks 48 assigned to UDSR 52(b) is counted, multiplying by the size of a chunk 48. Sub-step 114 may also include subtracting the size of all blocks within UDSR 52(b) that have been invalidated due to deletion.

In some embodiments, step 110 includes sub-step 115, in which the amount of metadata 54, 72 is tracked using a cursor position 76. For example, the metadata cursor position 76-a may be used to calculate how much metadata 54 there is, and the VLB cursor position 76-d may be used to calculate how much additional metadata 72 there is. Reference is now made to FIG. 4.

Figure 4:
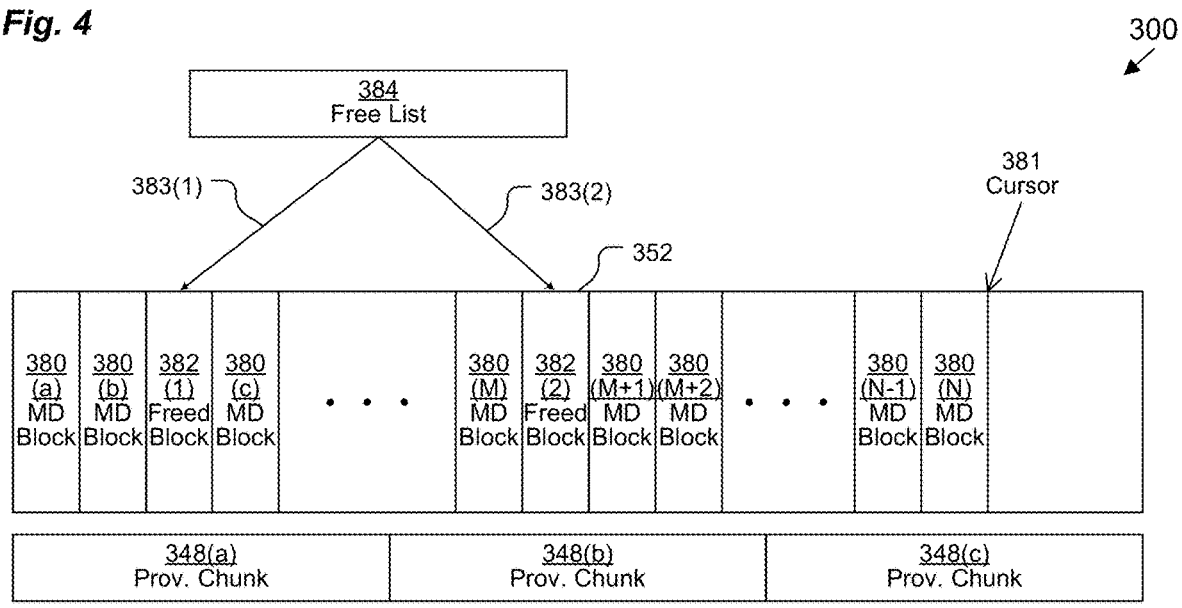
FIG. 4 is a block diagram depicting an example data structure arrangement for use in connection with various embodiments.

FIG. 4 depicts an example arrangement 300 of a metadata tier 352 that implements DMSR 52(a). It should be understood that a similar arrangement may also be used for Additional DMSR 52(d). Metadata tier 352 is backed by a plurality of provisioned chunks 48, depicted as three chunks 348(a), 348(b), 348(c). Metadata blocks 380 (depicted as MD Blocks 380(a), 380(b), 380(c), . . . 380(M), 380(M+1), 380(M+2), . . . 380(N−1), 380(N)) are written sequentially to the metadata tier 352. A metadata block 380 may be, for example, 4 kilobytes in size, for example. A metadata block 380 may contain, for example, one or more nodes of a metadata tree (not depicted). If a node of metadata needs to be updated, the metadata block 380 that it is stored in may be updated in place. However, if an entire metadata block 380 is able to be deleted, then it is converted into a freed block 382, and a pointer 383 to that freed block 382 is added to a free list 384. Thus, as depicted, a metadata block 380 between metadata blocks 380(b) and 380(c) has been deleted, forming freed block 382(1), and a metadata block 380 between metadata blocks 380(M) and 380(M+1) has been deleted, forming freed block 382(2). Pointers 383(1), 3838(2) to freed blocks 382(1), 382(2) are included within free list 384. Free list 384 may be arranged as a linked list or an array spread out across a set of one or more metadata blocks 380. Whenever a new metadata block 380 needs to be written, if there are any pointers 383 to freed blocks 382 within the free list 384, then the new metadata block 380 is written to one of the freed blocks 382 and its pointer 383 is removed from the free list 384. If there are no pointers 383 to any freed blocks 382 remaining within the free list 384, then the new metadata block 380 is written at the metadata cursor position 76-a, which represents the lowest address within the metadata tier 352 to which a metadata block 380 has not yet been written. This is indicated by the cursor 381.

Returning to FIG. 2, the cursor 381 indicates the maximum extent of metadata blocks 380 written to DMSR 52(a), so the position 76-a of cursor 381 multiplied by the metadata block size can be calculated to yield the size 55 of metadata 54 (noting that the size of the additional metadata 72 can also be calculated similarly and added thereto). Sub-step 115 may include either sub-step 116 or sub-step 117.

In sub-step 116, the size of the freed blocks 382 pointed to by the free list 384 is subtracted from the metadata cursor position 76-a (and a similar correction is also made to the VLB cursor position 76-d) prior to being added to the size 55 of the metadata. In an alternative embodiment, in sub-step 117, this correction for the size of the fee list 384 is not made.

In step 120, DSA 32 provisions a quantity of storage dedicated to the MCCP 68 based, at least in part, on a ratio 58 of the amount (e.g., size 55) of metadata 54, 72 to the amount (e.g., size 57) of user data 56. Step 120 can include four different use cases, depicted as sub-steps 122, 124, 126, 128.

In sub-step 122, in response to the ratio 58 increasing, the metadata manager 44 increases the size 66 of the DMCCR 52(c). In sub-step 124, in response to the total size 64 of all provisioned chunks 64 increasing, the metadata manager 44 increases the size 66 of the DMCCR 52(c).

In sub-step 126, in response to the ratio 58 decreasing, the metadata manager 44 decreases the size 66 of the DMCCR 52(c). In sub-step 128, in response to the total size 64 of all provisioned chunks 64 decreasing, the metadata manager 44 decreases the size 66 of the DMCCR 52(c).

Further detail with respect to step 120 is provided below in connection with FIG. 3.

Steps 110 and 120 may keep repeating, for example, every time an operation is performed that makes a change to data storage (e.g., a write, delete, or create operation). Step 130 may follow after steps 110 and 120 have each been performed one or more times.

In step 130, upon initiation of the MCCP 68, MCCP 68 builds tracking structures 70 within the provisioned storage (e.g., DMCCR 52(c)) dedicated to the MCCP 68. The remainder of the MCCP 68 is then performed to determine, with access to the tracking structures 70 within the DMCCR 52(c), where any errors within the metadata 54, 72 are located (and, in some embodiments, to fix those errors, if possible).

Figure 3:
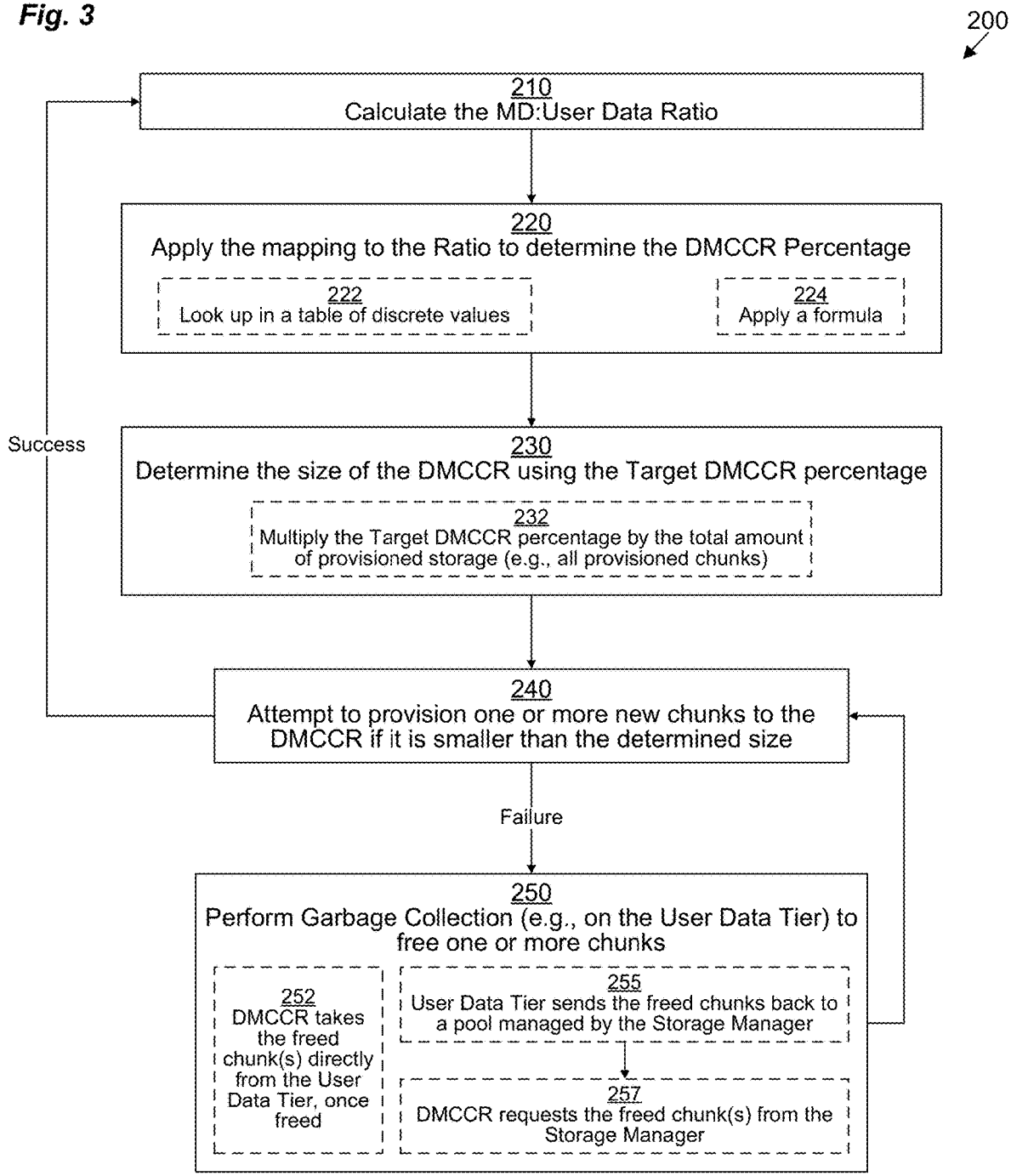
FIG. 3 is a flowchart depicting example methods of various embodiments.

FIG. 3 illustrates an example method 200 performed by mapping manager 44 running on DSA 32 for implementing step 120 of method 100. It should be understood that one or more of the steps or sub-steps of method 200 may be omitted in some embodiments. Similarly, in some embodiments, one or more steps or sub-steps may be combined together or performed in a different order. Dashed lines indicate that sub-steps are either optional or representative of alternate embodiments or use cases.

In step 210, mapping manager 44 calculates the ratio 58 of the amount (i.e., the size 55, calculated in step 110) of metadata 54, 72 to the amount (i.e., the size 57, calculated in step 110) of user data 56.

Then, in step 220, mapping manager 44 applies the mapping 60 to the ratio 58 to determine the target DMCCR percentage 62. In some embodiments, step 220 includes sub-step 222, while in other embodiments, step 220 includes sub-step 224. In sub-step 222, mapping manager 44 applies the mapping 60 by looking up the ratio 58 within a table of discrete values (see, for example, Table 1 above). In sub-step 224, mapping manager 44 applies the mapping 60 by applying a formula to the ratio 58 (e.g., dividing by 6.5).

Then, in step 230, mapping manager 44 determines the size 66 of the DMCCR 52(c) using the Target DMCCR percentage 62. In one embodiment, in sub-step 232, mapping manager 44 multiplies the Target DMCCR percentage 62 by the total amount of provisioned storage (e.g., the combined size 64 of all provisioned chunks 48). In another embodiment, mapping manager 44 performs a calculation such that, after provisioning the DMCCR 52(c) with chunks 48, its size 66 will be equal to the target DMCCR percentage 62 multiplied by the size 64 of all of the provisioned chunks 48 after provisioning the new chunks 48 to the DMCCR 52(c). It should be understood that the size 66 of the DMCCR 52(c) may not exactly equal the calculated value after provisioning because, in some embodiments, a tier 52 can only be provisioned with an integer number of chunks 48 (which can significantly affect the calculations if each chunk 48, 49 is 48 GB in size).

Then, in step 240, mapping manager 44 attempts to provision one or more new provisioned chunks 48 to the DMCCR 52(c) if it is smaller than the determined size 66.

If this attempt fails (e.g., if there are no free chunks 49 available or if there are fewer than a minimum permitted number based on a policy), then operation may proceed with step 250. Otherwise, operation may return back to step 210 or method 200 may terminate.

In step 250, mapping manager 44 performs garbage collection to free one or more provisioned chunks 48. For example, garbage collection may be performed on provisioned chunks 48 that belong to the UDSR 52(*b*) that have empty space due to the deletion of user data 56 therefrom. In one embodiment, in sub-step 252, as soon as the garbage collection operation frees a chunk 48 from UDSR 52(*b*), that chunk 38 is immediately assigned directly to the DMCCR 52(*c*) without first being returned as a free chunk 49 to the storage manager 42.

In another embodiment, in sub-step 255, once the garbage collection operation frees a chunk 48 from UDSR 52(*b*), it relabels it as a free chunk 49 and sends it back to a pool managed by the storage manager 42. Then, in sub-step 257, the mapping manager 44 again requests a free chunk 49 from the storage manager 42 on behalf of the DMCCR 52(*c*) in order to obtain the free chunk 49 that was just freed.

Thus, techniques have been presented for dynamically reserving close to exactly enough space for metadata consistency checking. This result may be accomplished by basing a reservation on the actual amount 55 of metadata 54, 72 used and particularly based on a ratio 58 of metadata 54, 72 to user data 56. The metadata 54, 72 and user data 56 usages can be tracked, allowing a ratio 58 to be calculated as usage changes. A mapping 60 between this ratio 58 and a target percentage 62 of the space under management to be reserved can then be applied to allow dynamic allocation of an appropriate amount of space 66 for metadata consistency checking. For example, a table of discrete values can be used, or a formula can be applied.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of managing storage space for a metadata consistency checking procedure (MCCP), the method comprising:
    tracking an amount of metadata and an amount of user data organized by the metadata;
    provisioning a quantity of storage dedicated to the MCCP based, at least in part, on a ratio of the amount of metadata to the amount of user data; and
    upon initiation of the MCCP, building tracking structures within the provisioned storage dedicated to the MCCP.

2. The method of claim 1 wherein provisioning the quantity of storage dedicated to the MCCP includes:
    calculating the ratio of the amount of metadata to the amount of user data;
    applying a mapping to the calculated ratio to yield a target percentage; and
    determining the quantity of storage dedicated to the MCCP by applying the target percentage to a measure of storage used in connection with the user data.

3. The method of claim 2 wherein applying the mapping includes indexing into a table with the calculated ratio.

4. The method of claim 2 wherein applying the target percentage to the measure of storage used in connection with the user data includes multiplying a total amount of storage that has been allocated by the target percentage.

5. The method of claim 2 wherein provisioning the quantity of storage dedicated to the MCCP further includes adding storage dedicated to the MCCP in response to the calculated ratio increasing.

6. The method of claim 2 wherein provisioning the quantity of storage dedicated to the MCCP further includes removing storage dedicated to the MCCP in response to the calculated ratio decreasing.

7. The method of claim 6 wherein provisioning the quantity of storage dedicated to the MCCP further includes refraining from removing storage dedicated to the MCCP in response to the calculated ratio decreasing below a minimum threshold value.

8. The method of claim 1,
    wherein the user data is stored within a user tier of storage (TOS) provided by a data storage system, the data storage system providing a plurality of different TOSs for a respective plurality of types of data;

wherein the plurality of different TOSs includes at least one metadata TOS and a consistency checking TOS; and wherein provisioning the quantity of storage dedicated to the MCCP includes provisioning the quantity of storage to the consistency checking TOS.

9. The method of claim 8 wherein tracking the amount of metadata includes reading a cursor value of the at least one metadata TOS, the cursor value indicating a lowest address of the metadata TOS to which metadata has not yet been written.

10. The method of claim 9 wherein tracking the amount of metadata further includes subtracting empty space within the metadata TOS below the cursor value by reading pointers from a list of freed blocks of metadata.

11. The method of claim 9, wherein the plurality of different TOSs further includes another metadata TOS for storing a special type of metadata different than stored in the metadata TOS; and wherein tracking the amount of metadata further includes:

reading another cursor value of the other metadata TOS, the other cursor value indicating a lowest address of the other metadata TOS to which the special type of metadata has not yet been written and summing the cursor value and the other cursor value.

12. The method of claim 8 wherein provisioning the quantity of storage to the consistency checking TOS includes:

initially failing to be able to provision an entirety of the quantity of storage to the consistency checking TOS due to a lack of a free chunk of storage; and in response to failing, initiating garbage collection within the user TOS to free a chunk of storage.

13. The method of claim 12 wherein provisioning the quantity of storage to the consistency checking TOS further includes directly provisioning the chunk of storage freed by collection to the consistency checking TOS.

14. A computer program product comprising a non-transitory computer-readable storage medium storing a set of instructions, which, when performed by processing circuitry of a data storage apparatus (DSA), causes the DSA to manage storage space for a metadata consistency checking procedure (MCCP) by:

tracking an amount of metadata and an amount of user data organized by the metadata;

provisioning a quantity of storage dedicated to the MCCP based, at least in part, on a ratio of the amount of metadata to the amount of user data; and upon initiation of the MCCP, building tracking structures within the provisioned storage dedicated to the MCCP.

15. A data storage apparatus (DSA) comprising:

a plurality of non-transitory persistent storage drives; and processing circuitry coupled to memory configured to manage storage space for a metadata consistency checking procedure (MCCP) by:

tracking an amount of metadata and an amount of user data organized by the metadata;

provisioning a quantity of storage dedicated to the MCCP based, at least in part, on a ratio of the amount of metadata to the amount of user data; and upon initiation of the MCCP, building tracking structures within the provisioned storage dedicated to the MCCP.

* * * * *